(12) United States Patent
Javitt

(10) Patent No.: US 6,285,857 B1
(45) Date of Patent: Sep. 4, 2001

(54) MULTI-HOP TELECOMMUNICATIONS SYSTEM AND METHOD

(75) Inventor: Joel I. Javitt, Hillside, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/847,196

(22) Filed: May 1, 1997

(51) Int. Cl.⁷ ........................................ H04B 7/14
(52) U.S. Cl. ...................... 455/15; 455/11.1; 379/56.2
(58) Field of Search ......................... 455/6.1, 15, 14, 455/74, 74.1, 11.1, 16; 379/56.1, 56.3, 56.2

(56) References Cited

U.S. PATENT DOCUMENTS

| | | | |
|---|---|---|---|
| 3,824,597 | * 7/1974 | Berg | 343/204 |
| 4,284,848 | * 8/1981 | Frost | 455/54 |
| 4,578,815 | 3/1986 | Persinotti . | |
| 4,682,367 | * 7/1987 | Childress et al. | 455/17 |
| 4,856,046 | * 8/1989 | Streck et al. | 379/56 |
| 4,959,874 | * 9/1990 | Saruta et al. | 455/13 |
| 5,218,715 | * 6/1993 | Leslie et al. | 455/15 |
| 5,241,410 | * 8/1993 | Streck et al. | 379/176 |
| 5,301,353 | * 4/1994 | Borras et al. | 455/9 |
| 5,321,736 | * 6/1994 | Beasley | 455/15 |
| 5,390,365 | 2/1995 | Enoki et al. . | |
| 5,392,462 | 2/1995 | Komaki . | |
| 5,400,338 | * 3/1995 | Flammer, III | 455/56.1 |
| 5,406,615 | 4/1995 | Miller, II et al. . | |
| 5,408,679 | * 4/1995 | Masuda | 455/16 |
| 5,424,859 | * 6/1995 | Uehara et al. | 455/90 |
| 5,465,392 | * 11/1995 | Baptist et al. | 455/522 |
| 5,737,328 | * 4/1998 | Norman et al. | 370/331 |
| 5,890,055 | * 3/1999 | Chu et al. | 455/16 |
| 5,898,679 | * 4/1999 | Brederveld et al. | 370/315 |
| 6,128,512 | * 10/2000 | Trompower et al. | 455/561 |

FOREIGN PATENT DOCUMENTS

WO 96/31021 * 10/1996 (AU) .
06-315005 11/1994 (JP) .
WO 95/35634 12/1995 (WO) .

OTHER PUBLICATIONS

"Rurtel: A Microwave System for Rural Telecommunication", by H. K. Ligotky, Electrical Communication, vol. 63, No. 3, 1989, Romford, Essex, pp. 200–210.

* cited by examiner

Primary Examiner—William Trost
Assistant Examiner—Tilahun Gesesse

(57) ABSTRACT

Free-space, line-of-sight, electro-magnetic communication (i.e., via light or microwaves) is employed to provide a wide range of communication services to geographically scattered users. A relay point or end point is typically associated with each user. Each relay point receives and retransmits information via line-of-sight communication. The end points are also receivers and transmitters of information via line-of-sight communication. Although spaced from one another, the relay and end points are close enough to one another to communicate via line-of-sight links. Hard-wired connections to the users are therefore unnecessary. Broadcast radio frequency communication capability may be provided as a backup for maintaining at least some service in the event of line-of-sight communication failure or interruption. This radio capability may additionally be used to provide cellular communication service to small cells associated with the relay and end points.

61 Claims, 3 Drawing Sheets

MULTI-HOP TELECOMMUNICATIONS SYSTEM AND METHOD

BACKGROUND OF THE INVENTION

This invention relates to telecommunications systems, and more particularly to telecommunications systems which can provide a wide range of services without the need for hard-wired connections to the end users of the system.

Traditional telecommunications systems rely heavily on hard-wired connections all the way to the end points of the system. For example, traditional telephone systems employ twisted pair wiring to each home, office, or other location served by the system. Traditional cable television systems similarly employ coaxial cable or optical fiber to each end user of the system. Such extensive hard-wired networks are extremely costly to install and maintain. A new service provider who is restricted to such technologies must therefore make an enormous capital investment in hard-wired plant before that provider can even begin to extend service to a new area. Existing technologies such as twisted pair wire or coaxial cable also have limited service capabilities. Upgrading such hard-wired connections (e.g., to optical fiber) to offer more services is very expensive even for the owner of the network.

In view of the foregoing, a need exists for new ways for telecommunications services providers to gain access to end users of such services. Such new access should be of lower cost than traditional hard-wired connections, and should also have greater capacity than such traditional technologies as twisted pair wire and even coaxial cable.

It is therefore an object of this invention to provide telecommunications systems which allow access to end users of the system without the need for hard-wired connections to those users.

SUMMARY OF THE INVENTION

This and other objects of the invention are accomplished in accordance with the principles of the invention by providing telecommunications systems which employ substantially unguided, point-to-point, free-space, electro-magnetic (i.e., optical or microwave) communication between area access points and end users in that area. For example, an area may be served from one or more area access points, each having a transceiver for bi-directional, free-space, line-of-sight, electro-magnetic communication with one or more nearby relay points. Each of these relay points has at least two transceivers, one of which is for the above-mentioned communication with the associated area access point, and the other of which is for similar bi-directional, free-space, line-of-sight, electro-magnetic communication with another nearby relay point or end point. An end point is similar to a relay point except that an end point has only one transceiver. Relay point and end point transceivers may be located on the roofs of houses in the neighborhood served from the above-mentioned area access point(s). Users of the system may be located at any relay point or end point.

Preferably at least a fraction of the relay points are reachable via more than one path through the network of relay points. In this way, if line-of-sight communication between two relay points is temporarily broken, service can still be provided through other relay points.

In addition to the above-described line-of-sight communication between the area access points, relay points, and end points, broadcast radio frequency communication is preferably provided between these points for such purposes as (1) helping to initially set up the system for line-of-sight communication and (2) backup communication for at least some services in the event of failure of the line-of-sight communication. It is contemplated that radio frequency communication will be needed for these purposes only infrequently. However, some of the radio frequency communication apparatus provided for the above purposes can also be used to provide wireless (e.g., mobile, cullular, and/or cordless) communication service in the area served by the system. For example, each relay point and end point can be the antenna in the center of a small cellular communictations cell.

The capacity of the line-of-sight communications network described above can be very high, thereby enabling the system to provide a wide range of services. Such services may include basic telephone service, high density mobile telephone service (e.g., as described at the end of the preceding paragraph), video service (analogous to CATV service), high-speed bi-directional digital data service, digital television service, etc.

Although it is anticipated that most of the line-of-sight communications links in networks constructed in accordance with this invention will be provided by light, point-to-point microwave links can be used either in place of or as backup for some optical links. For example, microwave links may be used for connections that are longer than can conveniently be made optically. Or particularly important optical links may be backed up with microwave in case extremely bad weather interferes with optical communication.

At least some of the transceivers used for the bi-directional, free-space, line-of-sight, electro-magnetic communication may be repositionable, e.g., to correct for misalignments and/or to completely redirect the transceiver for communication with any one of a plurality of other area access points, relay points, and/or end points. Such repositioning may be at least partly controlled using data about the locations of the various points in the system. This location data may be at least partly determined using a global positioning system.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
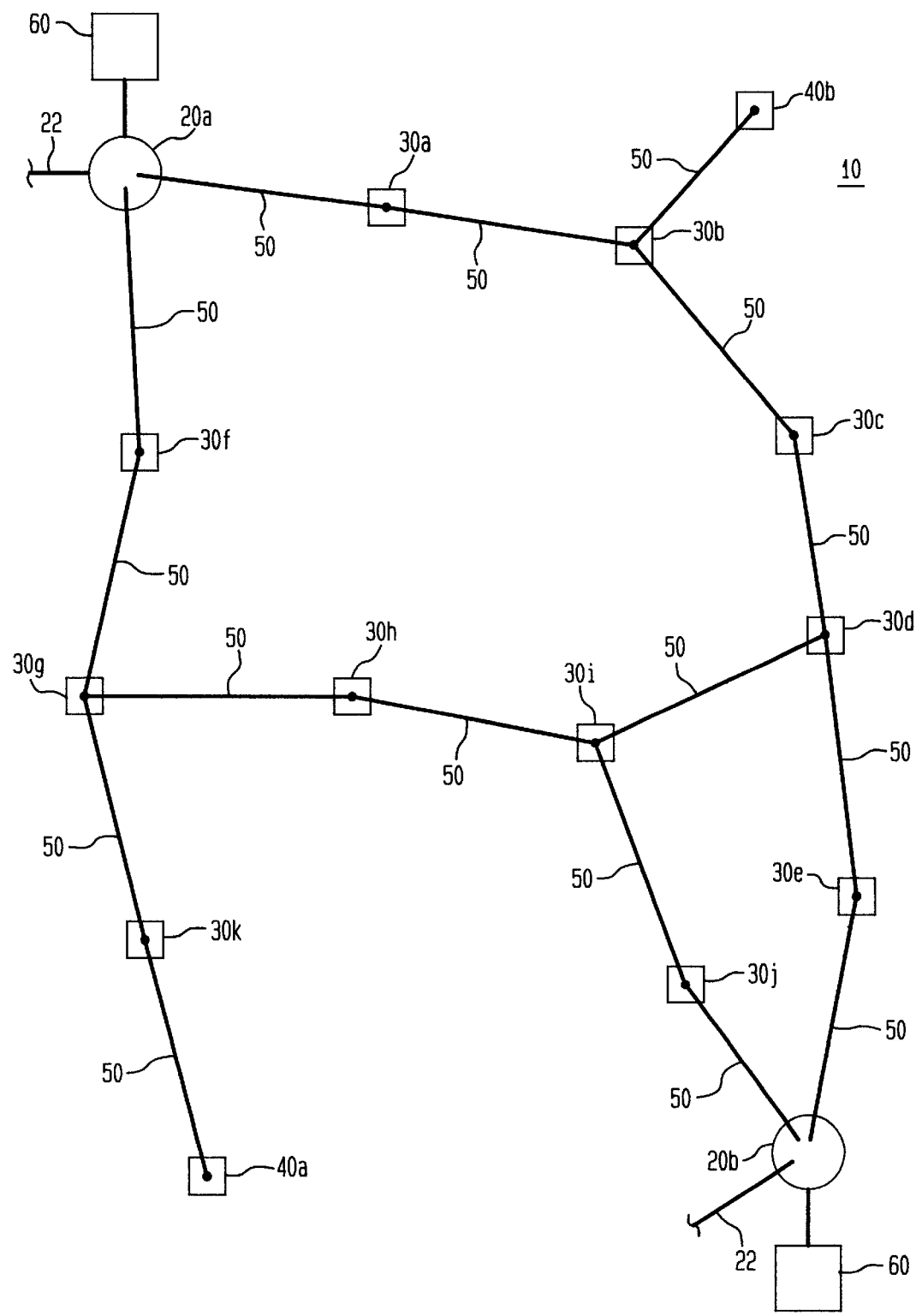
FIG. 1 is a simplified plan view of an illustrative installation of a system constructed in accordance with this invention.

An illustrative area 10 served by a communications system constructed in accordance with this invention is shown in FIG. 1. In the network shown in FIG. 1 all of the communications links 50 in area 10 are assumed to be optical links. In a later portion of this specification examples will be given as to how microwave links may be used in place of or in addition to optical links.

Area 10 is accessed from two gateway locations or area access points 20a and 20b in or near area 10. Each of area access points 20 is connected to other external communications equipment (e.g., the global telephone network, one or more sources of television programming, etc.) via conventional connections 22. For example, these connections 22 may be optical fibers extending to access points 20. Access points 20a and 20b are preferably substantially redundant of one another, offering substantially redundant communication with area 10. Therefore connections 22 are also preferably substantially redundant connections to the above-mentioned external communications equipment.

Each of access points 20 preferably includes one or more (two in the depicted embodiment) free-space optical transceivers mounted relatively far from the ground to facilitate unobstructed, line-of-sight communication 50 between the access point transceivers and similar transceivers on nearby relay points (e.g., relay points 30a and 30f in the case of access point 20a, and relay points 30e and 30j in the case of access point 20b). For example, the access point transceivers may be mounted on relatively tall structures such as high-rise apartment or office buildings, communications or electric utility towers, utility poles, or the like. The transceivers of relay points 30 (and end points 40, discussed below) may be mounted, for example, on the roofs of houses within area 10. Although longer distances may be used if desired, the typical distance between communicating points 20 and 30 is less than about 500 to about 1000 meters.

Each relay point 30 has at least two, and in some cases more than two, free-space optical transceivers for line-of-sight optical communication 50 with an area access point 20, one or more other relay points 30, and/or one or more end points 40. For example, relay point 30c is a typical relay point with two transceivers for optical communication 50 with relay points 30b and 30d, respectively. Relay point 30k is typical of a relay point with two transceivers for communicating with relay point 30g and end point 40a, respectively. And relay point 30i is typical of a relay point with three transceivers for communicating with relay points 30d, 30h, and 30j, respectively.

End points like 40a and 40b are similar to relay points 30, except that an end point has only one optical transceiver for free-space optical communication 50 with a relay point 30.

In general, each user of communications services in area 10 is associated with one of relay points 30 or end points 40. Conversely, each relay point 30 or end point 40 generally has one or more users associated with it, although some relay points 30 without users may be needed to reach users at more distant relay or end points.

Area 10 could be served from only one area access point 20, but it is preferred to have at least two area access points 20 for each area for such reasons as to provide backup in the event of failure or obstruction of one of the area access points or the optical communications links 50 between that area access point and the relay and/or end points in the area. More than two area access points 20 could be provided for area 10 to provide even more backup capability. Similarly, multiple links 50 from each access point 20 into area 10 are desirable for backup in the event of failure or obstruction of some links. At least some relay points 30 with three or more optical transceivers for communication 50 with three or more other relay points are also desirable to provide multiple communications paths through area 10 in the event of failure or obstruction of some links 50. As an example of the foregoing, relay point 30c can communicate via any of several paths such as 20a-30a-30b-30c, 20a-30f-30g-30h-30i-30d-30c, 20b-30e-30d-30c, and 20b-30j-30i-30d-30c. If the link 50 between relay points 30b and 30c were to fail or become obstructed, there would still be several paths via which full service could be maintained to relay point 30c.

Figure 2:
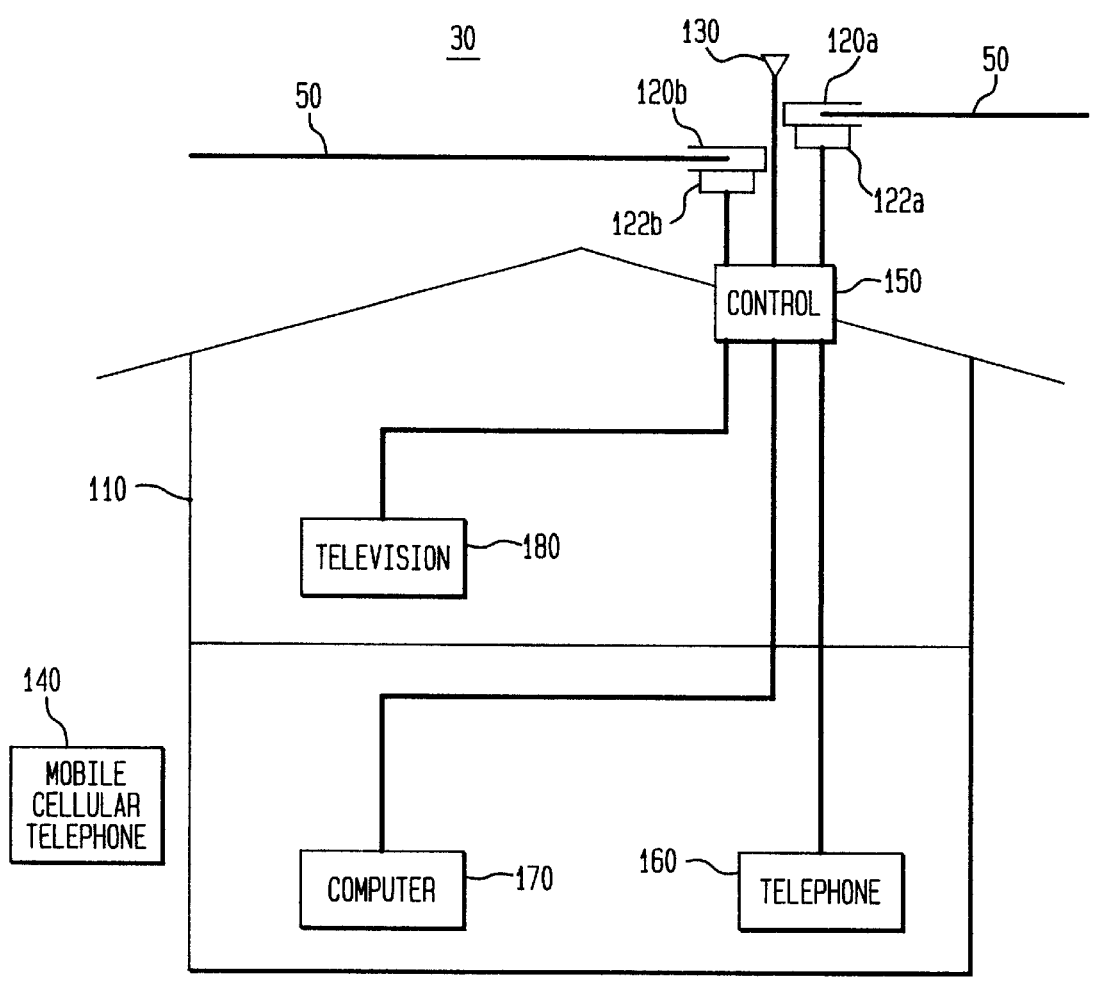
FIG. 2 is a simplified elevational view of an illustrative embodiment of a representative portion of the apparatus shown in FIG. 1.

In the illustrative embodiment of representative relay point 30 shown in FIG. 2, two free-space optical transceivers 120a and 120b and a radio antenna 130 are mounted on the roof of the house 110 of a user of the communications services provided by the system. At least one of transceivers 120 communicates bi-directionally via a free-space optical communication link 50 to an area access point 20 or another relay point 30. One of transceivers 120 may communicate with an end point 40. If the apparatus shown in FIG. 2 were for an end point 40, only one transceiver 120 would be required. In all other respects, the construction and operation of an end point 40 can be generally similar to what is shown in FIG. 2 and described below (with modifications appropriate to the presence of only one transceiver 120). Each transceiver 120 detects light it receives via the associated communication link 50 and produces a corresponding output signal applied to associated circuitry 150. Each transceiver 120 also responds to an input signal from circuitry 150 by transmitting corresponding light (e.g., from light emitting elements such as laser diodes) via the associated communication link 50.

Radio antenna 130 may be part of a conventional IS136 radio port for cellular communication with other similar cellular communications equipment (e.g., at one or more of area access points 20 or other conventional cellular base stations). Any conventional cellular communication may be used such as CDMA, TDMA, IS95, or GSM. Radio antenna 130 may additionally be used for cellular communication with nearby wireless telephones such as the mobile cellular telephone shown at 140 in FIG. 2. In this context radio antenna 130 and associated circuitry 150 functions as a small base station.

As has already been indicated, elements 120 and 130 are connected to relay point control circuitry 150. The user's communications equipment such as telephone 160, computer 170, and television 180 are also appropriately wired to control circuitry 150.

Control circuitry 150 typically performs and/or controls several functions. One function of control circuitry 150 is to process signals from photodetectors in each of transceivers 120 and to cause the light emitting elements in the other of transceivers 120 to transmit corresponding light, possibly with some modifications. An example of such modifications is the addition to the light transmitted by transceivers 120 of information originating at relay point 30 (e.g., voice information from telephones 140 and/or 160, digital data information from computer 170, entertainment service request information from television equipment 180, etc.). It will be understood that the telephone voice information referred to in the preceding sentence includes other conventional telephone control information such on-hook, off-hook, dialing, cellular telephone identification and control information, etc.

Another function of circuitry 150 is to retrieve from the signals received via either of transceivers 120 information needed by the user at relay point 30. For example, circuitry 150 may extract from the received light voice information for use by telephones 140 and/or 160, digital data for use by computer 170, video information for use by television 180, etc. Again, it will be understood that the above-mentioned telephone voice information includes other conventional telephone control information such as ringing, cellular telephone control information, etc. Similarly, it will be understood that the above-mentioned video information may include television control information such as cable television "set top box" control information (e.g., viewer authorization codes, on-screen program guide data, etc.).

Still another function of circuitry 150 is to control reception and/or transmission of information via radio communications antenna 130. For example, when optical communication via transceivers 120 is first being set up, or when it is being re-established after an interruption, radio communication via antenna 130 may be used for such purposes as to turn on transceivers 120, to cause mechanisms associated with transceivers 120 to move those transceivers to look for the optical signal from other remote transceivers with which the first transceivers should establish links 50, etc. This type of radio communication may be cellular-type communication with a central location such as an area access point 20. Another example of the radio communications via antenna 130 that circuitry 150 may control is cellular communication with mobile cellular telephone 140 as described earlier. Still another example of antenna 130 radio communication that circuitry 150 may control is cellular communication between relay point 30 and a central location such as an area access point 20 for the purpose of providing some basic backup service (such as basic telephone service) in the event all communication with relay point 30 via optical links 50 fails or is interrupted.

Yet another function of circuitry 150 may be to control normal automatic adjustments of the positions of transceivers 120 to maintain optimal optical communication 50 with other transceivers. For example, temperature or other environmental changes may cause a transceiver 120 to become misaligned with its intended optical communication path. This may be detected (e.g., by a quad sensor which is part of the transceiver) and the outputs of the detection applied to circuitry 150 for processing. The result of this processing may be output signals of circuitry 150 applied to mechanisms 122 that are capable of moving the misaligned transceiver. For example, mechanisms 122 may be capable of rotating the transceiver about vertical and horizontal axes, as well as shifting the transceiver left or right, or up or down. Thus in this capacity circuitry 150 forms part of servo controls for positioning or repositioning transceivers 120. This function of circuitry 150 is related to its possible use (described above) to initially position or reposition transceivers 120 during initial start-up, or during restarting or reconfiguring of the system after a failure or interruption.

Another function that circuitry 150 may perform is to select from among two or more received signals the better or best signal for use at relay point 30 and/or for retransmission to other points in the network (e.g., other relay points 30, end points 40, and/or area access points 20). For example, circuitry 150 may compare the strengths of the signals received via transceiver 120*a* and 120*b*. If circuitry 150 determines that the transceiver 120*a* signal is stronger and contains all the information needed by the user at relay point 30, circuitry 150 selects the transceiver 120*a* signal as the signal from which it derives the signals applied to devices 140, 160, 170, and/or 180. Alternatively, if circuitry 150 determines that the transceiver 120*b* signal is stronger and contains all necessary information, circuitry 150 derives the signals for devices 140, 160, 170, and/or 180 from the transceiver 120*b* signal. If relay point 30 has three or more transducers 120, circuitry 150 may compare the strength and information content of all of the incoming signals and select the strongest and/or most complete signal for local use and retransmission via the other transceivers that were not the source of the selected signal.

In connection with references to information content in the preceding paragraph, it will be appreciated that some of the communications links 50 in area 10 may carry the same or nearly the same information, while other links 50 may carry quite different information. For example, the link 50 between relay points 30*g* and 30*k* will carry, in the direction from 30*k* to 30*g*, substantially only information originated by the users at relay point 30*k* and end point 40*a*. In the opposite direction this link 50 will tend to carry much more information. The links 50 between relay point 30*g* and relay points 30*f* and 30*h* will tend to carry, in both directions, the relatively large amounts of information launched from area access points 20*a* and 20*b*, as well as information added by users at relay point 30*g* and other points connected to point 30*g* by various routings through the network of links 50.

Still another function of circuitry 150 is to monitor the condition of the network at relay point 30 and to report that condition to overall network control circuitry 60 (see FIG. 1). Circuitry 150 transmits such reports using links 50 if possible; but if not, then via radio frequency antenna 130. For example, circuitry 150 may report that it is receiving signals via all of its transceivers 120, or it may report that one or more of its transceivers 120 is not receiving signals. As another example, circuitry 150 may report on the relative strengths of the transceiver 120 signals it is receiving.

Overall network control circuitry 60 controls the flow of information throughout the network in area 10. To some extent circuitry 60 performs this function in cooperation with the circuitry 150 in each of the relay and end points 30 and 40 in area 10. For example, if one or more of circuits 150 reports to circuit 60 that a link 50 is not operating, circuit 60 attempts to find an alternate route for all information that would otherwise be carried by the inoperative link, and circuit 60 commands appropriate circuits 150 in a manner appropriate to establishing that alternate route. As a specific illustration of this, if the link 50 between relay points 30*b* and 30*c* is reported to circuit 60 as inoperative, circuit 60 may instruct the circuit 150 at relay point 30*b* to direct all information originating at that relay point out via the link 50 to relay point 30*a*, and may similarly instruct the circuit 150 at relay point 30*c* to direct all information originating at that relay point out via the link 50 to relay point 30*d*. In addition, circuit 60 may instruct the circuitry 150 at relay point 30*a* to send information received from relay point 30*b* back to area access point 20*a*, and circuit 60 may instruct the circuitry 150 at relay point 30*d* to send information received from relay point 30*c* back to access point 20*a* or 20*b* via the best route (i.e., 30*d*-30*i*-30*h*-30*g*-30*f*-20*a*, 30*d*-30*i*-30*j*-20*b*, or 30*d*-30*e*-20*b*). As another example of the role played by circuit 60, if both optical links 50 to relay point 30*b* were reported as interrupted, circuit 60 would attempt to establish radio frequency communication with relay point 30*b* via the radio frequency antenna 130 of that relay point as described above.

Network control point circuit 60 may contain a database of the exact location of each transceiver 120. Such location information can be obtained at the time of installation using a global positioning system ("GPS") or differential GPS. Based on this information, circuit 60 can determine the pointing direction to instruct each transceiver 120 to use. For example, circuit 60 may direct the control circuitry 150 at relay point 30*b* to use the appropriate mechanism 122 to reposition its transceiver 120 that was previously pointed toward relay point 30*c* to point toward relay point 30*i*. Circuit 60 may do this by computing the exact angles both in the horizontal plane and elevation based on the locations of the transceivers. These locations are stored in a database and possibly are determined based on using GPS or a similar positioning system at the time of installation. Similarly, circuit 60 may also direct the control circuit 150 at relay point 30i to use the appropriate mechanism 122 to reposition the transceiver 120 that was previously pointed toward relay point 30j to point toward relay point 30b. Once both transceivers are pointed in the correct direction, they may refine the alignment (again using mechanism 122) by going through a search pattern. Circuit 60 may also play a role in coordinating such a search process.

Thus control circuitry 60 cooperates with relay and end point control circuits 150 to control the routing of signals throughout area 10, both during normal operation of the system and when special measures must be taken to compensate for various kinds of failures or interruptions in the system. The manner in which responsibility for this control of the network is allocated between central control 60 and distributed controls 150 can be varied as desired. For example, virtually all of the signal routing control for the network can be allocated to central control 60, with distributed controls 150 primarily reporting local conditions and acting on instructions from the central control. Or more decision-making responsibility can be allocated to distributed controls 150 (e.g., decisions regarding which of two or more signals received via associated transceivers 120 should be retransmitted via the other transceivers associated with those controls).

Although other frequencies of light can be used for optical communications links 50, in the presently preferred embodiments infrared light is used. One or several light frequencies may be used in each link 50. Information may be transmitted by analog or digital modulation of the light.

From the foregoing it will be appreciated that the systems of this invention may employ many relatively short but interconnected free-space optical communications links 50 to reach users throughout potentially large areas. The optical signals are 30 regenerated at each relay point 30 so that free-space optical communication can be used to enable information to travel relatively long distances. The network of free-space optical communications links 50 preferably has sufficient interconnectivity so that even if some links 50 fail or are interrupted, alternate routes can be found through the network to compensate for the failed or interrupted links. If all else fails, radio communication is available to maintain at least some service to any user. Alternatively, the radio frequency equipment at each relay and end point 30 and 40 doubles as base stations for local wireless telephone communication.

Figure 3:
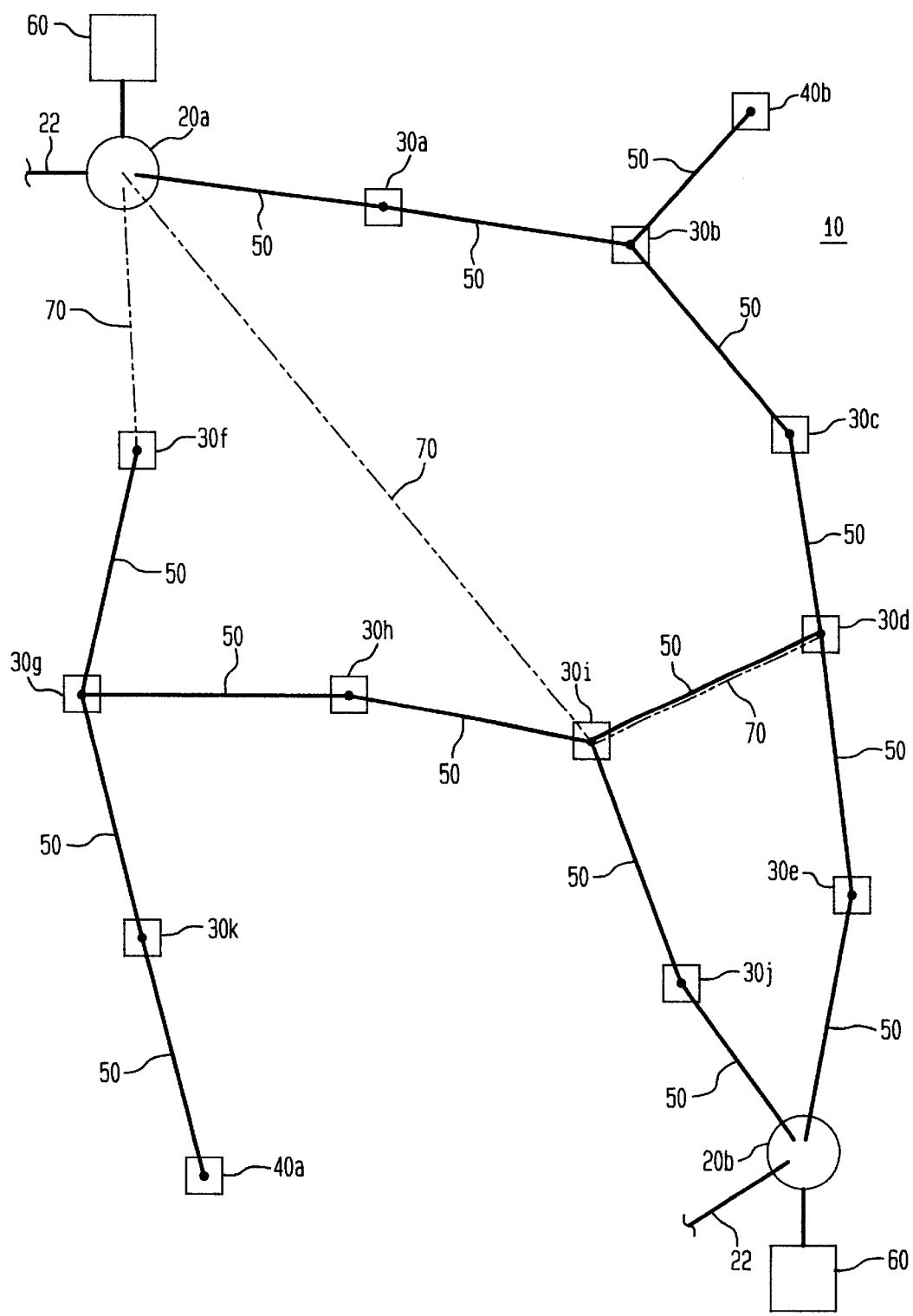
FIG. 3 is a view similar to FIG. 1 showing illustrative modifications of the FIG. 1 system in accordance with this invention.

If desired, point-to-point, free-space, line-of-sight, microwave communication may be used either in place of or as backup for some of the optical links in the networks of this invention. For example, FIG. 3 shows an alternative embodiment of the network of FIG. 1 in which bi-directional, line-of-sight, microwave communication links 70 are used as follows: (1) in place of the optical communication link 50 between nodes 20a and 30f, (2) as backup for the optical link 50 between nodes 30d and 30i, and (3) as another backup route into and out of area 10 between nodes 20a and 30i. These are just some examples of how microwave links 70 may be used as supplements or additions to optical links 50 or as replacements for optical links 50 in some instances. For example, microwave links 70 may be useful for making longer connections than can conveniently be made optically. Or microwave links 70 may be useful for backing up particularly important optical links 50 in the event that bad weather interrupts those optical links.

Except for using a different transmission medium (i.e., point-to-point, line-of-sight, free-space microwaves rather than light), microwave links 70 may be generally similar to optical links 50. Thus either of the transceivers 120 shown on representative relay point 30 in FIG. 2 can be converted to a microwave transceiver. Or one or more microwave transceivers can be added to the depicted optical transceivers 120. In other respects the relay point 30 apparatus can be constructed and operated as described above. "Electromagnetic communication" is sometime used herein as a generic term for the above-described optical and microwave communication.

It will be understood that the foregoing is only illustrative of the principles of the invention, and that various modifications can be made by those skilled in the art without departing from the scope and spirit of the invention. For example, the number of area access points 20 serving an area 10 can be more or less than the two shown in FIG. 1, the numbers of relay and end points 30 and 40 can be varied, the number of free-space, line-of-sight, electro-magnetic communication transceivers 120 at each relay point can be varied, etc. The use of end points 40 is entirely optional, and it may be possible to construct certain networks with only relay points 30 and no end points at all.

The invention claimed is:

1. A communications system comprising:
   an area access point, having a transceiver for outdoors bi-directional, free space, line-of-sight, electro-magnetic communication;
   a plurality of relay points spaced from one another and from said area access point and interconnected by communication links in cascade fashion, each of said relay points having a plurality of transceivers for bi-directional, free-space, line-of-sight, electro-magnetic communication with the transceiver of said area access point or a transceiver of another of said relay points, each of said relay points also having circuitry for detecting information received by each of the transceivers of that relay point and for causing another transceiver of that relay point to transmit at least some of that information, at least some of said relay points including user interface apparatus for selectively providing to a user at that relay point at least some of the information received by the transceivers of that relay point and for selectively adding additional information produced by said user to the information transmitted by the transceivers of that relay point; and
   a mechanism located at least two of said points configured to selectively reposition at least one of the transceivers at said points so as to establish a new communication link between said two points.

2. The apparatus defined in claim 1 wherein at least some of said transceivers employ light for said bi-directional, free-space, line-of-sight, electro-magnetic communication.

3. The apparatus defined in claim 2 wherein said light is infrared light.

4. The apparatus defined in claim 1 wherein some of said transceivers employ microwaves for said bi-directional, free-space, line-of-sight, electro-magnetic communication.

5. The apparatus defined in claim 1 wherein at least some of said relay points further include:
   radio frequency communication apparatus for radio communication with a remote location for information that cannot be communicated via said line-of-sight communication.

6. The apparatus defined in claim 5 wherein said radio frequency communication apparatus is capable of bi-directional communication.

7. The apparatus defined in claim 6 wherein said radio frequency communication apparatus is selectively usable as part of said user interface apparatus of the associated relay point for radio communication with a wireless telephone in the vicinity of that relay point.

8. The apparatus defined in claim 1 wherein at least some of said relay points include three of said transceivers for communication with three other relay points, respectively.

9. The apparatus defined in claim 8 wherein said circuitry of a relay point with three transceivers is capable of transmitting via any two of those transceivers at least some of the information received via any third one of those transceivers.

10. The apparatus defined in claim 1 further comprising:
an end point spaced from said area access point and said relay points, said end point having a transceiver for bi-directional, free-space, line-of-sight, electromagnetic communication with a transceiver of one of said relay points, said end point including user interface circuitry for selectively providing to a user at that end point at least some of the information received by the transceiver of that end point and for selectively adding additional information produced by a user at that end point to the information transmitted by the transceiver at that end point.

11. The apparatus defined in claim 10 wherein said end point further includes:
radio frequency communication apparatus for radio communication with a remote location for information that cannot be communicated via said line-of-sight communication.

12. The apparatus defined in claim 11 wherein said radio frequency communication apparatus is capable of bi-directional communication.

13. The apparatus defined in claim 12 wherein said radio frequency communication apparatus is selectively usable as part of said user interface apparatus of said end point for radio communication with a wireless telephone in the vicinity of that end point.

14. The apparatus defined in claim 1 wherein at least some of said relay points that include said user interface apparatus further include a telephone operatively connected to said user interface apparatus.

15. The apparatus defined in claim 1 wherein at least some of said relay points that include said user interface apparatus include a television operatively connected to said user interface apparatus.

16. The apparatus defined in claim 1 wherein at least some of said relay points that include said user interface apparatus include a computer operatively connected to said user interface apparatus.

17. The apparatus defined in claim 1 wherein said area access point has a plurality of transceivers for bi-directional, free-space, line-of-sight, electro-magnetic communication with a plurality of said relay points, respectively.

18. The apparatus defined in claim 1 wherein said area access point further includes a connection to an external source of information to be supplied to said relay points.

19. The apparatus defined in claim 18 wherein said connection additionally communicates information from said relay points to an external destination for said information from said relay points.

20. The apparatus defined in claim 1 further comprising:
a second area access point spaced from said area access point and said relay points, said second area access point having a transceiver for bi-directional, free-space, line-of-sight, electro-magnetic communication with a relay point which is different from any relay point in direct line-of-sight communication with said area access point, at least some of said relay points communicating with one another via said line-of-sight communication in a series that includes said area access point and said second area access point at respective opposite ends of said series.

21. The apparatus defined in claim 1 wherein at least some of said transceivers are movable by remote control to position them for said line-of-sight communication.

22. The apparatus defined in claim 1 wherein said mechanism is responsive to control signals that are at least partly determined from data about the location of a transceiver at another point.

23. The apparatus defined in claim 22 wherein said data is at least partly determined using a global positioning system.

24. The apparatus defined in claim 1 wherein said mechanism is configured to selectively align said at least one of said transceivers with a transceiver at any one of a plurality of other points.

25. Relay point apparatus for use in a communications system comprising:
a plurality of transceivers for outdoors, bi-directional, free-space, line-of-sight, electro-magnetic communication with locations remote from said apparatus, said transceivers being interconnected by communication links in cascade fashion;
a mechanism configured to selectively reposition at least two spaced apart transceivers so as to establish a new communication link between said two transceivers;
circuitry for detecting information received by each of said transceivers at a relay point and for causing at least one of said transceivers at that relay point to transmit at least some of that information; and
user interface apparatus for selectively providing to a user at that relay point at least some of the information received by said transceivers and for selectively adding additional information produced by said user to the information transmitted by said transceivers.

26. The apparatus defined in claim 25 wherein at least one of said transceivers employs light for said bi-directional, free-space, line-of-sight, electro-magnetic communication.

27. The apparatus defined in claim 26 wherein said light is infrared light.

28. The apparatus defined in claim 25 where at least one of said transceivers employs microwaves for said bi-directional, free-space, line-of-sight, electro-magnetic communication.

29. The apparatus defined in claim 25 further comprising:
radio frequency communication apparatus for radio communication with a remote location.

30. The apparatus defined in claim 29 wherein said radio frequency communication apparatus is used for information that cannot be communicated via said line-of-sight communication.

31. The apparatus defined in claim 29 wherein said radio frequency communication apparatus is capable of bi-directional communication.

32. The apparatus defined in claim 31 wherein said radio frequency communication apparatus is selectively usable as part of said user interface apparatus for radio communication with a wireless telephone in the vicinity of that relay point.

33. The apparatus defined in claim 25 wherein said relay point includes three of said transceivers for communication with three remote locations, respectively.

34. The apparatus defined in claim 33 wherein said circuitry is capable of transmitting via any two of said transceivers at least some of the information received via any third one of said transceivers.

35. The apparatus defined in claim 25 further comprising:
a telephone operatively connected to said user interface apparatus.

36. The apparatus defined in claim 25 further comprising:
a television operatively coupled to said user interface apparatus.

37. The apparatus defined in claim 25 further comprising:
a computer operatively coupled to said user interface apparatus.

38. The apparatus defined in claim 25 wherein at least one of said optical transceivers is movable by remote control to position it for said line-of-sight communication.

39. The apparatus defined in claim 26 wherein said mechanism is configured to align at least one of said transceivers at a relay point with a transceiver at any one of a plurality of locations remote from said relay point.

40. The apparatus defined in claim 39 wherein said mechanism is responsive to control signals that are at least partly determined from data about the locations of said plurality of locations remote from said relay point.

41. The apparatus defined in claim 40 wherein said data is at least partly determined using a global positioning system.

42. A method of providing communication service comprising:
using outdoors, bi-directional, free-space, line-of-sight, electro-magnetic communication to transmit information between transceivers at an area access point and a plurality of relay points spaced from one another and from said area access points and interconnected by communication links in cascade fashion;
at each relay point, detecting information received via said electro-magnetic communication from said area access point or another of said relay points and retransmitting at least some of the detected information via said electro-magnetic communication to said area access point or yet another of said relay points;
at a relay point, supplying at least some of the information detected in said detecting to a user at that relay point;
at a relay point, adding information produced by a user at that relay point to information transmitted in said retransmitting; and
repositioning transceivers at two of said points to establish a new communication link between said points.

43. The method defined in claim 42 further comprising:
using light for at least some of said electro-magnetic communication.

44. The method defined in claim 42 further comprising:
using infrared light for at least some of said electro-magnetic communication.

45. The method defined in claim 42 further comprising:
using microwaves for at least some of said electro-magnetic communication.

46. The method defined in claim 42 further comprising:
communicating information to said relay points via broadcast radio when information cannot be satisfactorily transmitted to a relay point via said electro-magnetic communication.

47. The method defined in claim 42 further comprising:
communicating information from a relay point via broadcast radio when information cannot be satisfactorily transmitted from said relay point via said electro-magnetic communication.

48. The method defined in claim 42 wherein said supplying and adding comprise:
communicating information between a relay point and a wireless telephone in the vicinity of a relay point via broadcast radio.

49. The method defined in claim 42 wherein a relay point communicates with three others of said points, and wherein said method further comprises at that relay point:
selecting information received from any one of said three others of said points as information to be transmitted in said retransmitting step to the remaining ones of said three others of said points.

50. The method defined in claim 42 further comprising:
using said electro-magnetic communication to transmit information between an area access point or a relay point and an end point which is spaced from said area access point and said relay points.

51. The method defined in claim 50 further comprising at said end point:
detecting information received via said electro-magnetic communication; and
supplying at least some of the information detected in the preceding step to a user at that end point.

52. The method defined in claim 51 further comprising:
transmitting information produced by a user at said end point to the area access point or relay point with which said end point communicates via said electro-magnetic communication, said transmitting being via said electro-magnetic communication.

53. The method defined in claim 42 wherein said supplying and adding comprise:
communicating with a telephone at a relay point at which said supplying and adding are performed.

54. The method defined in claim 42 wherein said supplying comprises:
communicating with a television at a relay point at which said supplying is performed.

55. The method defined in claim 42 wherein said supplying and adding comprise:
communicating with a computer at a relay point at which said supplying is performed.

56. The method defined in claim 42 wherein said repositioning is at least partly controlled on the basis of data about the locations of said points.

57. The method defined in claim 56 further comprising:
collecting said data using a global positioning system.

58. A communications system comprising:
an area access point, having a transceiver for bi-directional, free-space, line-of-sight, electro-magnetic communication;
a plurality of relay points spaced from one another and from said area access point and interconnected by communication links in cascade fashion, each of said relay points having a plurality of transceivers for outdoors, bi-directional, free-space, line-of-sight electro-magnetic communication with the transceiver of said area access point or a transceiver of another of said relay points, each of said relay points also having circuitry for detecting information received by each of the transceivers of that relay point and for causing another transceiver of that relay point to transmit at least some of that information, a preponderance of said relay points including user interface apparatus for selectively providing to a user at that relay point at least some of the information received by the transceivers of that relay point and for selectively adding additional information produced by said user to the information transmitted by the transceivers of that relay point; and a mechanism located at at least two of said points configured to selectively reposition at least one of the transceivers at said points so as to establish a new communication link between said two points.

59. A method of providing communication service comprising:

using outdoors, bi-directional, free-space, line-of-sight, electro-magnetic communication to transmit information between transceivers at an area access point and a plurality of relay points spaced from one another and from said area access point and interconnected by communication links in cascade fashion;

at each relay point, detecting information received via said electro-magnetic communication from said area access point or another of said relay points and retransmitting at least some of the detected information via said electro-magnetic communication to said area access point or yet another of said relay points;

at a preponderance of said relay points, supplying at least some of the information detected in said detecting to a user at that relay point and adding information produced by a user at that relay point to information transmitted in said retransmitting; and repositioning transceivers at two of said points to establish a new communication link between said points.

60. A communications system comprising:

an area access point, having a transceiver for outdoors bi-directional, free-space, line-of-sight, electro-magnetic communication; and a plurality of relay points spaced from one another and from said area access point and interconnected by communication links in cascade fashion, each of said relay points having a plurality of transceivers for bi-directional, free-space, line-of-sight electro-magnetic communication with the transceiver of said area access point or a transceiver of another of said relay points, at least some of said transceivers being selectively repositionable under remote control so as to establish a new communication link, each of said relay points also having circuitry for detecting information received by each of the transceivers of that relay point and for causing another transceiver of that relay point to transmit at least some of that information, at least some of said relay points including user interface apparatus for selectively providing to a user at that relay point at least some of the information received by the transceivers of that relay point and for selectively adding additional information produced by said user to the information transmitted by the transceivers of that relay point.

61. A method of providing communication service comprising:

using outdoors bi-directional, free-space, line-of-sight, electro-magnetic communication to transmit information between transceivers at an area access point and a plurality of relay points spaced from one another and from said area access point and interconnected by communication links in cascade fashion;

at each relay point, detecting information received at a first transceiver via said electro-magnetic communication from said area access point or another of said relay points and retransmitting from a second transceiver at least some of the detected information via said electro-magnetic communication to said area access point or yet another of said relay points;

at a relay point, supplying at least some of the information detected in said detecting to a user at that relay point;

at a relay point adding information produced by a user at that relay point to information transmitted in said retransmitting; and repositioning at least one transceiver under remote control to change a point with which that transceiver communicates.

* * * * *